May 22, 1934.  C. MacH. LINDSAY  1,960,114
ILLUMINATING MAGNIFYING GLASS
Filed Nov. 12, 1931
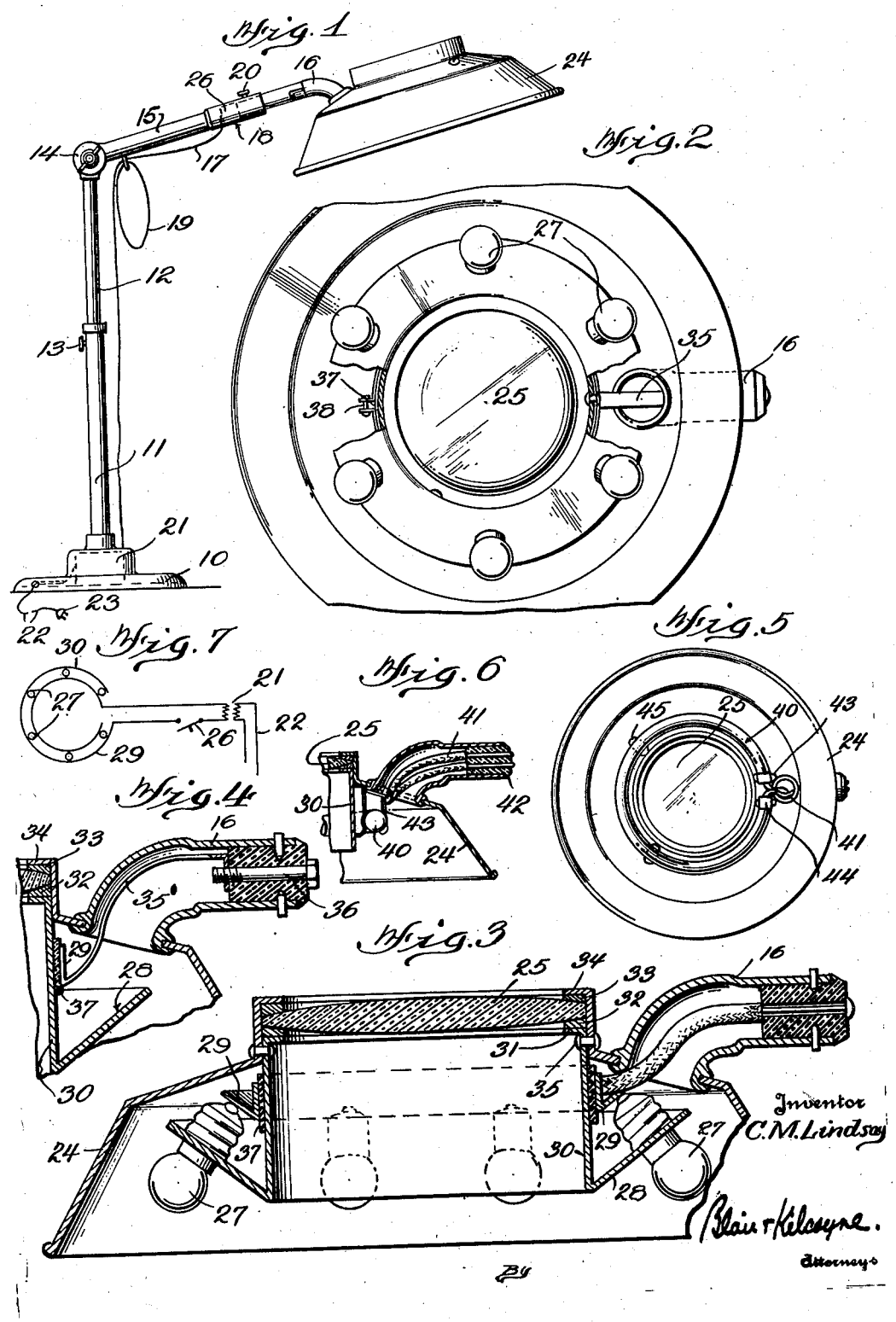

Patented May 22, 1934

1,960,114

UNITED STATES PATENT OFFICE 1,960,114

ILLUMINATING MAGNIFYING GLASS

Charles MacHenry Lindsay, Washington, D. C.

Application November 12, 1931, Serial No. 574,647

10 Claims. (Cl. 88—39)

This invention relates to magnifying glasses and more particularly to small portable magnifying glasses having means associated therewith for illuminating the object, material, or surface to be examined through the glass. Besides forming a desirable reading glass, for example, it may be noted that the present invention is especially adapted for use by mechanics, watch makers, and artisans of various kinds where fine work is involved. In trying to read or work with the ordinary magnifying glasses, when the source of illumination is from above or to one side, the glare on the glass is annoying and tiring to the eyes. Precision mechanics when marking on irregular surfaces viewed through a magnifying glass such as watches, aviation instruments, or fine electrical windings, find that a strong light from one or two sources casts deep shadows on the objects viewed through the lens, frequently introducing errors in the work.

Other attempts to provide the illumination of objects viewed through lenses have been bulky, heavy and limited to one angle of illumination due to a limited source of current when small bulbs and batteries are used, or due to the size and weight of bulbs, sockets, etc. necessary when connected direct to standard lighting voltages.

It is accordingly one of the objects of the present invention to provide a simple and practical device of the above general character which is light and compact and which may be inexpensively manufactured and assembled.

A further object is to provide a device that will permit the illumination of an object viewed through a lens in such a manner that the light does not glare on the lens or into the eyes of the observer.

A further object is to provide means for illuminating an object, viewed through a lens, from a sufficient number of angles and of great enough light intensity to eliminate shadows, especially on objects having irregular surfaces.

A further object is to provide a device of the character described that will be light and compact, due to light weight and small size of bulbs and sockets, yet not be limited to battery operation as it can be attached to any convenient source of electric current.

A further object is to provide a device of the character described having a light reflector whose focal point will coincide with that of the lens.

A further object is to provide a device of the above character which may not only be set up in adjusted position with respect to the work with which it is used, but may also be considered as a portable, self-contained device to be moved freely by hand from one position to another.

A further object is to provide a device of the above character in which the light from the illuminating means will be properly shielded from the eyes of the observer, as well as the surface of the lens.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, a drawing depicting a preferred form of the invention has been annexed as a part of this disclosure, in which—

Fig. 1 is an elevation of the complete apparatus;

Fig. 2 is a detail inverted plan view of the glass and associated illuminating means;

Fig. 3 is a detail in section showing one form of reflector and mounting;

Fig. 4 is an enlarged detail sectional view showing the mounting of the lens and electrical connection;

Fig. 5 is an inverted plan showing a modification;

Fig. 6 is a detail sectional view showing the mounting and electrical connection of Fig. 5;

Fig. 7 is a diagrammatic representation of the electrical wiring arrangement of form shown in Fig. 2.

Referring now to the drawing in detail and more particularly to Fig. 1, 10 indicates a hollow base of any desired style, which may be mounted upon a floor or a desk, from which extends a tube 11 and a telescoping tube 12 adapted to be positioned at any desired height by adjusting means such as set screw 13. At the top of the element 12 is a flexible joint 14 for a projecting rod or tube 15 which may be set at any desired angle with respect to the tube 12.

The tube 15 is open at its upper end and is also slotted as at 18 on its under side, thereby to receive a handle 16 and associated electric cord 17, which latter may pass outwardly through the slot 18 to extension means such as loop 19. Holding means such as set screw 20 is provided to hold the handle 16, which carries a lens and reflector as will be later apparent, in any desired adjusted position. It may be noted here that the electric cord or wire 17 preferably passes downwardly about the support 11 and through the base to a transformer or series resistance 21, thence by means of cord 22 to a socket plug 23. By this arrangement, the apparatus may be plugged into any suitable source of house current, with the transformer 21 stepping down the voltage to the amount desired for illuminating the small lights surrounding the glass in the form shown in Fig. 2 as will be hereinafter described.

The device shown in Fig. 3, which is the glass illustrated at the top of Fig. 1, comprises a substantially circular reflector 24 having an opening in its center in which is mounted a magnifying glass or lens 25. The handle 16 is arranged to extend from one side of the reflector 24 with its axis at right angles to the optical axis of the glass 25, whereby if desired the apparatus may be held in one hand while working with the other, for example. This handle 16 may be provided with a detachable switch 26 convenient for manipulation by the operator, thereby to energize the lights 27 which are arranged at a plurality of points, preferably six, and equi-distances from each other, around the lens 25. This arrangement of lights will illuminate the article or surface to be examined from all sides and prevent the casting of any shadows from one projecting part upon an adjacent portion.

The lights 27 are preferably small incandescent bulbs, such as are used in ordinary flash lights, which operate on a low voltage to reduce glare, and for that reason the transformer 21 is preferably provided. Obviously a storage battery or dry cells could be substituted and the transformer eliminated.

These lights or bulbs 27 are preferably screwed into sockets pressed or otherwise formed in an annular disc or support 28 of sheet metal. One lead from the cord 17 passes around the reflector as diagrammatically shown in Fig. 7 and is connected with one of the terminals of each light, while the opposite terminal or return lead is connected with the reflector 24, the reflector itself and associated metallic parts thus serving as the return circuit. Such an arrangement is permissible where relatively low voltages are utilized, and by arranging the lights in parallel with the return circuit formed by the reflector, a material reduction in the cost of manufacture and assembly of the parts results.

The support 28 may be formed integral with or secured to a substantially cylindrical sleeve 30 centrally mounted within the reflector 24, and serving as a light shield or barrier between the lights 27 and the lens or glass 25. The upper extremity of the sleeve 30 is provided with an inwardly turned flange 31, Fig. 3, to support a gasket or packing 32 of felt or the like which cooperates with the edge or periphery of lens 25. A second gasket 33 is provided on the upper surface of the lens and an inwardly turned flange 34 formed on the reflector is pressed downwardly thereon prior to permanently securing the parts in position as by means of rivets or screws 35. Such an arrangement is exceedingly simple and inexpensive.

The style of reflector shown in Fig. 5 is of conventional or well known design and with the sleeve or shield 30 provides an efficient reflecting surface. The reflector, however, may take any one of a number of desired forms. A convenient form of electrical assembly is shown in Fig. 4.

One common terminal 29 for the lights 27 is electrically connected by means of rigid conductor 35' passing up through handle 16 to a bolt 36 which acts as the central plug contact. This is insulated from other terminals 28 and 30 by an insulation band 37. This terminal 29 is of band form (Fig. 2) and clamps the insulation in place by adjusting bolt 38.

In Figs. 5 and 6 a modification is shown. Here instead of using flashlight bulbs of low voltage, a high voltage lamp 40 of the neon or other gas type is used. The color of the light may be varied accordingly. This lamp being of high voltage requires a modification of the transformer 21 and also in the electrical circuit at the handle. In other words, two leads 41 are connected at one end through socket plug 42 in a well known manner, while the other ends coact with clips 43 engaging the metallic ferrules 44 at the ends of the circular lamp bulb 40. One or more insulating clips 45 support the lamp 40 as necessary.

It is believed that the method of operation and use of the device herein described will be obvious to those familiar with the subject. It may be stated, however, that the complete apparatus is set up substantially as shown in Fig. 1 with the light or reflector turned towards the object or article to be examined. The switch 26 is operated to close the circuit between the source of supply and the lamps whereupon it will be seen that the object is brightly illuminated and all shadows eliminated by reason of the position of the light source. Likewise the shield 30 protects the eyes of the observer from any light emanating from the several bulbs. One may then loop through the lens 25 and see the surface or article under inspection not only magnified but free from shadows, and can work thereon as may be necessary with both hands. If desired, however, the handle 16 and associated lens and reflector may be removed from the standard shown in Fig. 1 and carried from one position to another to examine different sides of the piece of work as desired. In making the device, care should be used to proportion the parts whereby the focal points of the glass and reflector should coincide to obtain the greatest efficiency.

From the above it will be seen that the present invention contemplates a relatively simple, practical, and inexpensive apparatus well adapted to accomplish, among others, all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a device of the character described, a reflector having a central opening, a shield member secured to and extending within the reflector and having an opening aligned axially with the opening of the reflector, a magnifying lens, cooperating means on the reflector and shield member providing a mounting for said lens, with the axis of the lens extending along the axis of said openings, and illuminating means disposed within the reflector and about the shield member with said shield member serving as a barrier between the illuminating means and said lens.

2. In a device of the character described, a reflector having a central opening, a shield member secured to and extending within the reflector and having an opening aligned axially with the opening of the reflector, a magnifying lens, cooperating means on the reflector and shield member providing a mounting for said lens, with the axis of the lens extending along the axis of said openings, the shield member being provided with means providing a support for illuminating means, and illuminating means mounted on said support, with the shield member serving as a barrier between the illuminating means and said lens.

3. In a device of the character described, a reflector having a central opening defined by a circular extension, a shield member secured to and disposed within the reflector having one end extending into said opening, said shield member being provided with an opening aligned axially with the reflector opening, a magnifying lens, cooperating means formed on the circular extension and on said end of the shield member providing a mounting for the lens with the axis of the lens extending along the axis of said openings, and illuminating means disposed within the reflector and about the shield member, with the shield member serving as a barrier between said illuminating means and the lens.

4. In a device of the character described, a reflector having a central opening defined by a circular extension, a shield member secured to and disposed within the reflector having one end extending into said opening, said shield member being provided with an opening aligned axially with the reflector opening, a magnifying lens, cooperating means formed on the circular extension and on said end of the shield member providing a mounting for the lens with the axis of the lens extending along the axis of said openings, the shield member being extended at its other end to provide a support for illuminating means, and illuminating means mounted on the support, with said shield member serving as a barrier between the illuminating means and said lens.

5. In a device of the character described, a reflector having a central opening defined by a circular extension having an inturned flange, a tubular shield member within the reflector and having an end extending into and secured to said extension, said end having an inturned flange, a magnifying lens, said inturned flanges providing a mounting for said lens, and illuminating means disposed within the reflector and about said shield member, with the shield member serving as a barrier between the illuminating means and the lens.

6. In a device of the character described, a reflector having a central opening defined by a circular extension having an inturned flange, a tubular shield member within the reflector and having an end extending into and secured to said extension, said end having an inturned flange, a magnifying lens, said inturned flanges providing a mounting for said lens, said shield member having its other end extended to provide a support for illuminating means, and illuminating means mounted on said support, with the shield member serving as a barrier between the illuminating means and the lens.

7. In a device of the character described, a reflector having a central opening, a shield member secured to and extending within the reflector and having an opening aligned axially with the opening of the reflector, a magnifying lens, cooperating means on the reflector and on one end of said shield member providing a mounting for said lens, with the axis of the lens extending along the axis of said openings, a conductor disposed about the shield member, the shield member at its other end having an extension, lamp sockets formed in said extension, and lamps in said sockets electrically connected to said conductor.

8. In a device of the character described, a reflector having a central opening, a shield member secured to and extending within the reflector and having an opening aligned axially with the opening of the reflector, a magnifying lens, cooperating means on the reflector and on one end of said shield member providing a mounting for said lens, with the axis of the lens extending along the axis of said openings, a conductor disposed about the shield member at its other end having an extension, lamp sockets formed in said extension, lamps in said sockets electrically connected to said conductor, and a lead-in wire electrically connected to said conductor, with the reflector and associated metallic parts adapted to provide a return connection to a source of electrical energy.

9. In a device of the character described, the combination of a reflector having a central opening, a tubular shield member arranged within the reflector and having one end secured to the reflector adjacent the aforesaid opening, a magnifying lens, cooperating means on said reflector and shield member providing a mounting for said lens, low voltage lights within the reflector and carried by said shield member, connections between said lights and a source of electrical energy, and means for stepping down the voltage generated at said source to the voltage range of said lights.

10. In a device of the character described, a reflector having a central opening, a tubular shield member arranged within the reflector and having one end secured thereto adjacent the aforesaid opening, a magnifying lens, cooperating means on said reflector and shield member providing a mounting for said lens, the shield member being provided with an outwardly directed extension providing a support for illuminating means, illuminating means mounted on said support, and a handle on the reflector through which extend connections to said illuminating means from a source of electrical energy.

CHARLES MacHENRY LINDSAY.